United States Patent Office 3,430,135
Patented Feb. 25, 1969

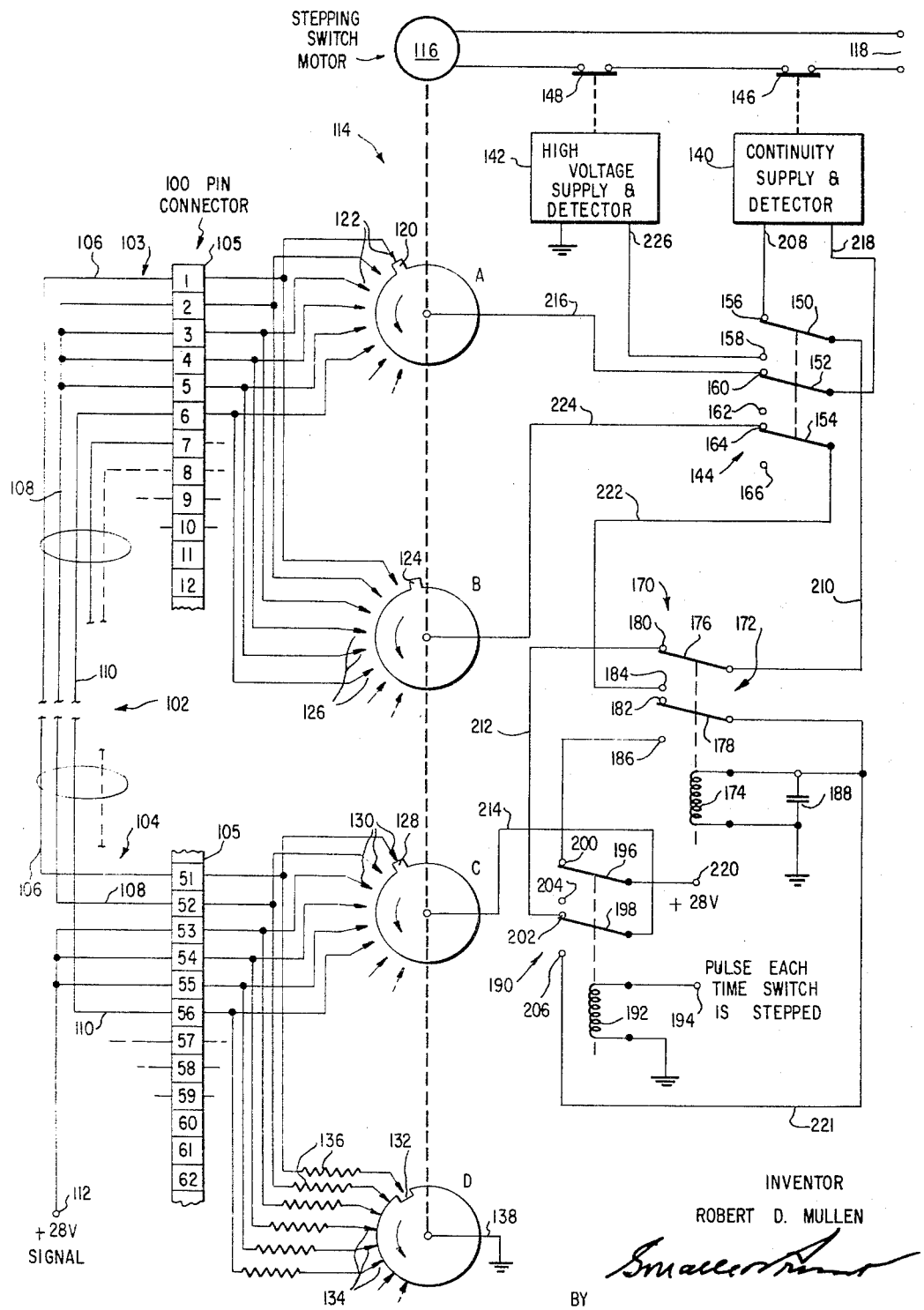

3,430,135
AUTOMATIC CIRCUIT FAULT TESTER FOR MULTIPLE CIRCUITS INCLUDING MEANS RESPONSIVE TO BLANK TERMINALS AT ENDS OF THE CIRCUITS UNDER TEST
Robert D. Mullen, 7534 Wilbur Ave., Reseda, Calif. 91335
Filed Mar. 5, 1964, Ser. No. 349,611
U.S. Cl. 324—51                              22 Claims
Int. Cl. G01r 31/02

This invention relates to automatic circuit testers and, more particularly, to automatic testers for testing multi-conductor cables or assemblies containing multiple circuits.

At the outset, it will be useful to define certain terms. A "simple circuit" is a circuit having two terminations, a common example being a conductor having a single terminal at each of its ends. A "multiple circuit" is a circuit with more than two terminations and will typically be in the form of a conductor which is connected to a single terminal at one end and to a plurality of terminals at the other end. When a multiple circuit is included within a multi-conductor cable or cable harness, the conductor will be connected to a terminal at one end and to a corresponding terminal and one or more succeeding terminals at its other end. The terminals at the first end corresponding to the succeeding terminals at the other end will ordinarily be blank terminals (not connected to any circuit or conductor).

In the past, a number of systems have been proposed for automatically testing multi-conductor cables and the like for continuity and for dielectric strength or insulation resistance. When the cable contains only simple circuits, this is easily accomplished. The conductors of the cable are successively tested for continuity; and, in making a high voltage test for insulation resistance, each circuit is, in turn, tested against all others. However, when the cable contains multiple circuits, a short will be indicated during the high voltage test unless some means is provided to differentiate between multiple circuits and short circuits; and a continuity test between a multiple circuit leg and a corresponding blank terminal at the opposite end of the cable will result in a false negative indication.

Prior art solutions of this problem have tended to be complex and cumbersome. It has been proposed, for example, to connect jumper wires between the single terminal at one end of the multiple circuit and the adjacent blank terminals corresponding to the multiple circuit legs at the opposite end. In this way, continuity would normally exist between successive terminals at each end of the cable. Although continuity tests with the jumper wires added would then be satisfactory, the cable must also be subjected to a high voltage test for insulation resistance or leakage. Since the high voltage test requires that a high voltage be applied to the circuit being tested and that all circuits except the one being tested be shorted together and connected to ground, it will be apparent that the aforementioned jumper wires will result in an erroneous indication of a short to ground. In order to avoid this, it is necessary to employ a jumper plug which effectively disconnects all legs, other than the first leg of a multiple circuit, from the ground connection. Although this system is effective, it has several disadvantages. A unique jumper plug must be made for each different type of cable, and the operator must be certain to have the proper plug for the particular cable being tested. In addition, this system presents problems of storage, is expensive, and is inconvenient to use.

Accordingly, it is the principal object of this invention to provide an improved automatic circuit tester for testing circuit assemblies including multiple circuits.

An additional object is the provision of an automatic cable tester for testing cables having multiple circuits which avoids the need to employ special jumper wires and jumper plugs.

Another object of the invention is the provision of an automatic tester for testing multiple circuits for continuity and high voltage breakdown which is easy to use, effective, and economical.

A further object of the invention is the provision of an automatic tester for multi-conductor cables including multiple circuits, which is capable of distinguishing between multiple circuits and short circuits while making a high voltage breakdown test.

Yet another object of the invention is the provision of an automatic cable tester including a stepping switch for connecting a continuity detector successively to corresponding terminals at opposite ends of the cable being tested and including control means responsive to connection of the stepping switch to a blank terminal at one end of the cable, corresponding to a multiple circuit leg at the opposite end, for connecting the continuity detector between the corresponding multiple circuit leg and the lagging adjacent multiple circuit leg at said opposite end.

A related object is the provision of such an automatic circuit tester with means for connecting a high voltage breakdown detector successively to the conductors of the multiconductor cable and for effectively grounding all other conductors of the cable and means responsive to the connection of the detector to a blank terminal, corresponding to a multiple circuit leg at the opposite end of the cable, for disconnecting the detector therefrom.

Briefly, the invention contemplates the connection of a control voltage to the blank terminals of the cable corresponding to multiple circuit terminals at the opposite end. A stepping switch having four switch wafers is provided. A first switch wafer is adapted for successive connection to successive terminals at one end of the cable, while a second switch wafer is adapted for successive connection to corresponding terminals at the opposite end of the cable. A third switch wafer, lagging the first and second switch wafers, is adapted to be connected to successive terminals preceding the corresponding terminals at the first end. A relay circuit is responsive to the control voltage at the blank terminal for automatically connecting the continuity tester between the first and third switch wafers when the second wafer reaches a blank terminal. While making the high voltage test, a fourth switch wafer which effectively grounds all terminals but the corresponding terminal is employed. When the second switch wafer contacts a blank terminal connected to the control voltage, the high voltage detector is automatically disconnected from the terminal being tested.

The foregoing and other objects, advantages, and features of the invention and the manner in which the same are accomplished will become more readily apparent upon consideration of the following detailed description of the invention taken in conjunction with the accompanying drawing, which illustrates a preferred and exemplary embodiment, and wherein the single figure is a circuit diagram of a preferred form of the invention.

Referring to the drawing, an automatic circuit tester of the invention is shown connected to both ends 103 and 104 of a multi-conductor cable 102, which is to be tested, by means of a hundred pin connector 105. The cable 102 is of the type having fifty corresponding terminals at each end which may be interconnected with any arrangement of simple and multiple circuits. In the example shown, the terminal 1 at end 103 of the cable is connected by means of conductor 106 to a corresponding terminal 51 at end 104 of the cable to form a simple, two-terminal circuit. On the other hand, the terminal 52 at end 104 represents one end of a multiple circuit, the other end of which (connected to terminal 52 through conductor 108) is connected to a corresponding terminal 2 at end 103 and to adjacent succeeding terminals 3, 4, and 5. It will be observed that terminals 53, 54, and 55 at end 104, which correspond to multiple circuit terminals, or legs, 3, 4, and 5 at end 103, are not connected to multiple circuit conductor 108 and, being unconnected to any cable circuit, may be characterized as "blank" terminals. Terminals 6 and 56 are again interconnected by a single conductor 110 to form another simple circuit. While the interconnections between the remaining terminals 7–50 at end 103 and 57–100 at end 104 are not specifically shown, it will be understood that these terminals are interconnected to form simple or multiple circuits in any possible combination.

In accordance with the teachings of the invention, the blank terminals (53, 54 and 55) are coupled by means of a terminal 112 to a +28 volt control voltage signal. The purpose of this control voltage signal will be explained hereinafter.

It will be observed that the automatic tester of the invention includes a stepping switch 114, having a stepping switch motor 116, energized from a voltage supply line 118, and four ganged switch wafers A, B, C, and D. It will be understood that stepping switch motor 116 is conventional in form and is of the type which periodically pulses itself to step from position to position. Switch wafer A includes a contact finger 120, adapted successively to contact a plurality of fixed contacts 122 which are respectively connected to successive terminals 1–50 at end 103 of cable 102 through connector 105. Switch wafer B includes a contact finger 124, adapted successively to contact successive fixed contacts 126 which are also respectively connected to the terminals 1–50 of cable 102. Switch wafer C employs a contact finger 128, adapted successively to contact fixed contacts 130 which are respectively connected to terminals 51–100 at the end 104 of cable 102. It will be observed, however, that switch contact finger 124 of switch wafer B lags contact fingers 120 of wafer A and 128 of wafer C by one position. The purpose of this arrangement will become apparent hereinafter.

Switch wafer D is provided with a notch 132 at a position corresponding to the position of contact fingers 120 of wafer A and 128 of wafer C and is maintained in contact with a group of fixed contacts 134 at all positions except the position of notch 132. These fixed contacts 134 are respectively connected through individual resistors 136 to contact terminals 51–100 at end 104 of cable 102 through connector 105. The value and purpose of resistors 136 will be described more fully hereinafter. It will be observed that switch wafer D is grounded by means of conductor 138.

Stepping switch 114 serves to connect either a continuity detector 140 or a high votage breakdown or leakage detector 142 to the cable being tested as determined by the position of a function switch 144. The continuity detector may, as is known in the art, comprise a current supply and a normally energized relay connected in series between terminals 208 and 218. A lack of continuity will be indicated when an absence of current causes the relay to close an alarm circuit while at the same time it opens a switch 146 in the supply circuit to stepping switch motor 116 causing the stepping switch to stop at the position where there is a lack of continuity. The high voltage detector 142 may, as is known in the art, comprise a series circuit between ground and terminal 26 of a supply of high voltage and a normally deenergized relay, which will respond to the presence of a leakage current. The relay would then energize an alarm circuit and open a switch 148 in supply circuit 118 to stepping switch motor 116 to stop the switch at a position at which there was an indication of a short or excessive leakage from a conductor under test.

The function switch 144 includes three switch arms 150, 152 and 154 which are ganged as shown and may be positioned in one of two positions. In the first position (shown in the drawing), which represents the continuity detector function, switch arm 150 is connected to a fixed terminal 156, while in the second, or high voltage test position, it would contact a fixed terminal 158. Switch arm 152 in the continuity test position contacts a fixed terminal 160 as shown in the drawing. In the high voltage test position, it would contact a fixed terminal 162. Likewise, switch arm 154 is shown contacting a fixed terminal 164 in the continuity test position, while in the high voltage test position it would contact fixed terminal 166.

The automatic circuit tester also comprises a control section 170, including a first relay 172 having a relay coil 174 which controls a pair of switch arms 176 and 178 which may be thrown to one of two positions. In the first position (shown in the drawing), switch arm 176 contacts a fixed contact 180, while switch arm 178 is in contact with a fixed contact 182. In the other position of the relay, switch arm 176 will contact a fixed contact 184; and switch arm 178 will be brought into contact with a fixed contact 186. It will be observed, also, that relay coil 174 is shunted by a capacitor 188.

Control circuit 170 additionally includes a second relay 190 having a relay coil 192, which is connected via terminal 194 to a source of pulses (not shown). This pulse source is arranged to provide a pulse each time stepping switch 114 is stepped, and this may be accomplished by coupling the switch 114 to the source. Relay 190 also includes a pair of switch arms 196 and 198, which, in a first position respectively contact fixed contacts 200 and 202, while, in a second position, these switch arms will respectively contact fixed contacts 204 and 206. The manner in which relay circuits 170 and 190 are interconnected to perform desired control functions, and the nature of these control functions, will be explained more fully in the following description of the operation of the automatic tester of the invention.

In making a continuity test, the function switch 144 will be in the position shown. Normally, a continuity test is made between corresponding terminals 1 and 51, 2 and 52, 3 and 53, and so forth, at the respective ends 103 and 104 of the multi-conductor cable 102. The test circuit may be traced from one terminal 208 of the continuity detector through fixed contact 156 of function switch 144, through switch arm 150 of this function switch, through a conductor 210 to switch contact 176 of relay 172, to fixed contact 180 of this relay, through conductor 212 to fixed contact 202 of relay 190, through contact 198 of this relay, and through conductor 214 to switch wafer C. The circuit will then proceed from contact finger 128 through a fixed contact 130, which in the instance shown is connected through connector 105 to terminal 51 at end 104 of cable 102, through conductor 106 of this cable to terminal 1 at its end 103, and through connector 105 to the corresponding fixed terminal 122 contacted by contact finger 120 of switch wafer A. The circuit then proceeds through conductor 216, fixed contact 160 of function switch 144, and switch arm 152 of this switch to the other terminal 218 of the continuity detector 140. If the circuit of conductor 106 between terminals 1 and 51 of cable 102 is complete, the continuity detector will so indicate. If, however, this circuit is broken, the continuity detector 140 will indicate a lack of continuity by sensing an absence of current and will also open switch 146 to prevent stepping switch motor 116 from stepping switch 114 to its next position.

Assuming that the test at the position corresponding to terminals 1 and 51 indicated continuity, the stepping switch would then step contact fingers 120 and 128 to the next position where they would contact the fixed contacts corresponding to terminals 2 and 52 of the multi-conductor cable 102. Assuming, again, that at this position, the circuit was complete, the stepping switch would then be stepped to the position corresponding to terminals 3 and 53. It will be observed that terminal 53 is a blank terminal because of the existence of a multiple circuit between terminal 52 and terminals 2 and 3; thus, there is no continuity between terminals 3 and 53. However, the control signal voltage applied at terminal 112, which is connected to terminal 53, will signify that this terminal is a blank terminal corresponding to a multiple circuit terminal at the opposite end of the cable. The voltage from terminal 112 will be conducted to wafer C through the fixed contact 130 corresponding to terminal 53, and contact finger 128, to conductor 214, and to moving contact 198 of relay 190. Since relay 190 is pulsed from terminal 194 every time stepping switch 114 is stepped, the moving contacts 196 and 198 will momentarily be moved to their lower positions. Thus, the control voltage from terminal 112 will proceed from moving contact 198 through fixed contact 206, conductor 221, and relay coil 174 of relay 172 to energize relay 172 momentarily. This will cause the moving contacts 176 and 178 of this relay to move to the lower position. Relay 190 will be pulsed for only a few milliseconds during the stepping switch pulse supplied at terminal 194. However, since capacitor 188 will provide a slight delay in drop out for positive action, contact 178 will still be in contact with fixed terminal 186 to complete a holding circuit through fixed terminal 200 and moving contact 196 of relay 190 to a terminal 220 of a +28 volts supply. It will be seen, then, that holding current will flow through moving contact 196, fixed contact 200, fixed contact 186, moving contact 178, and relay coil 174 to lock relay 172 in its lower position. With relay 172 in this energized position, the continuity detector 140 will no longer be connected in circuit between terminals 3 and 53, but will, instead, be connected between terminals 2 and 3. This circuit may be traced from terminal 208 of continuity detector 140 through fixed contact 156, switch arm 150, conductor 210, moving contact 176, fixed contact 184, a conductor 222, switch arm 154, fixed contact 164, a conductor 224, switch wafer B, contact finger 124, and the fixed contact 126 which, by virtue of the lagging position of switch wafer B, corresponds to the terminal 2 which just precedes terminal 3. Since at the previous position of the stepping switch, the continuity detector has indicated that there is continuity between terminals 2 and 52, there obviously also will be continuity between terminals 3 and 52. Thus, the connection between terminals 2 and 3 is utilized to provide a continuous circuit across the continuity detector so that it will indicate the existence of continuity at the switch position corresponding to terminals 3 and 53.

When stepping switch 114 is stepped to its next position, the pulse provided at terminal 194 will energize relay 190 to move moving contacts 198 and 196 again to their lower positions. This will break the holding circuit from terminal 220 and deenergize relay 170. At the same time, the stepping switch will have moved to the position corresponding to terminals 4 and 54, and the same process will be repeated until all of the multiple circuit legs have been tested. Relay 172 will then no longer be energized, and the test will resume between wafers A and C for the succeeding simple circuits.

When the cable is tested for high voltage breakdown or leakage, each circuit must be tested against all others. It is thus necessary to apply voltage to only one point of a conductor or multiple circuit, since this will energize the entire conductor or multiple circuit.

If we now consider that function switch 144 is moved to the high voltage test position (the lower position as shown in the drawing), resistors 136 will provide a path to ground through switch wafer D and conductor 138 for all of terminals 51–100 of cable 102 with the exception of the terminal corresponding with the position of notch 132. It will be understood that these resistors 136 are provided with a resistance value high enough so that they will look like an open circuit during the low voltage continuity test, but, during the high voltage test, will be of low enough value effectively to ground the terminals connected therethrough to switch wafer D. Thus, all circuits except the one under test are effectively shorted to ground. The circuit from the high voltage breakdown detector 142 may be traced from the high voltage terminal 226 of the detector 142 to fixed terminal 158 of function switch 144, switch arm 150 of this switch, conductor 210, moving contact 176 and fixed contact 180 of relay 172, conductor 212, fixed contact 202 and moving contact 198 of relay 190, conductor 214, switch wafer C, contact finger 128, and a fixed contact 130 to the conductor under test, which, in the example shown in the drawing, is the conductor 106 between terminals 1 and 51. As with continuity detector 140, when the high voltage detector indicates a fault, which in this case will be sensed as the presence of current, a suitable alarm circuit will be energized and the switch 148 will be opened to stop the stepping switch at the position of the fault.

When wafer C applies a voltage to terminal 52, voltage will also be applied to the multiple legs connected to terminals 2, 3, 4 and 5; thus, the tester need not make an actual test in the next three positions. Indeed, since terminals 53, 54, and 55 are effectively shorted together by virtue of their connection to terminal 112, an attempt to make a high voltage test at terminal 53 would result in a false indication of a short circuit; the same would be true of tests made at terminals 54 and 55. For this reason, when contact finger 128 reaches the fixed contact 130 corresponding to terminal 53, the +28 volt control signal applied at terminal 112 will be employed again to energize relay 172. This is accomplished through a circuit from terminal 112 through terminal 53, connector 105, the corresponding fixed contact 130, contact finger 128, switch wafer C, conductor 214, moving contact 198 (which will momentarily be in its lower position by virtue of momentary energization of relay 192), fixed contact 206, conductor 221, and relay coil 174. When moving contact 198 returns to its normal position in contact with fixed contact 202, the circuit from switch wafer C through conductor 214, moving contact 198, fixed contact 202, conductor 212, fixed contact 180, moving contact 176, conductor 210, switch arm 150, and fixed contact 158 to the terminal 226 of high voltage detector 142 will then be broken because moving contact 176 will be locked in its lower position in contact with fixed contact 184. Thus, since, under these circumstances, the high voltage detector will draw no current, it will indicate a "good" test. The stepping switch motor 116 will then step the switch to its next position to test the following circuit and the process will be repeated.

The stepping switch 114, as is customary, will move very rapidly from position to position and will dwell at each position for a longer period. In order to prevent the break in continuity due to the movement of the stepping switch from causing false operation of the continuity detector, the continuity detector relay may be provided with sufficient delay so that it will not operate in the time required by the stepping switch between positions. The relay should also be delayed for a period long enough to permit moving contact 176 of relay 170 to close on contact 184, if relay 170 has been energized by the control signal from terminal 112. The pulse provided at terminal 194 is timed to insure that contacts 196 and 198 of relay 190 are closed on contacts 204 and 206, respectively, at the time the stepping switch reaches its next position. Thus, when contact finger 128 reaches a blank terminal (such as terminal 53), the circuit from wafer C to high voltage detector 142 will be broken. In this way, the interconnection between the blank terminals due to their connection to terminal 112, will not cause a false indication of a short circuit by high voltage detector 142 during stepping. If desired, however, the high voltage detector relay may be provided with slight delay for this purpose. The pulse at terminal 194 will, of course, be of long enough duration to be still available after the stepping switch reaches the next position; this will enable the control voltage signal from terminal 112 to be applied through terminal 206 to relay coil 174.

While a preferred embodiment of the invention has been shown and described, it will be apparent to those skilled in the art that changes can be made without departing from the principles and spirit of the invention, the scope of which is defined in the appended claims. For example, although the invention has been described with particular reference to the testing of a multi-conductor cable, it will be appreciated that automatic circuit testers of the invention may be used to test any multi-conductor assembly containing simple and/or multiple circuits. It is also to be understood that the teachings of the invention are applicable to situations in which it it necessary to test cables or circuit assemblies in which pluralities of multiple circuit legs may be found at both ends. This might be accomplished by applying the control signal voltage to the corresponding blank terminals at both ends, adding an additional lagging switch wafer to effect appropriate connection of the continuity detector to adjacent multiple circuit legs at the second end, and adding appropriate circuit means to disconnect the high voltage detector from the circuit under test in response to a control voltage at blank terminals at either end. Accordingly, the foregoing embodiment is to be considered illustrative, rather than restrictive of the invention, and those modifications which come within the meaning and range of the equivalency of the claims are to be included herein.

The invention claimed is:

1. An automatic tester for testing a circuit assembly having a plurality of corresponding terminals at each end, said circuit assembly including one or more multiple circuits wherein one of the terminals at one end is connected to a corresponding terminal at the other end and to one or more succeeding terminals at said other end, the terminals at said one end corresponding to said succeeding terminals being blank and unconnected to said circuit; said tester comprising switch means for successively connecting corresponding terminals at said one and other ends of said circuit to a test circuit, and control means responsive to a connection of one of said blank terminals to said test circuit for connecting the corresponding terminal at said other end and the preceding terminal at said other end to said test circuit.

2. An automatic tester as recited in claim 1, said switch means comprising a stepping switch having a first switch wafer adapted for successive connection to the terminals at said other end, a second switch wafer adapted for successive connection to the corresponding terminals at said one end, and a third switch wafer for successive connection to the preceding terminals at said other end.

3. An automatic tester as recited in claim 2, said control means comprising means connecting a control voltage to said blank terminals, and means responsive to said control voltage for disconnecting said first switch wafer from said test circuit and for connecting said third switch wafer to said test circuit.

4. An automatic tester as recited in claim 3, said means responsive to a control voltage comprising a relay and means for connecting said relay to said control voltage through said second switch wafer.

5. An automatic tester as recited in claim 1, said control means comprising means connecting a control voltage to said blank terminals.

6. An automatic tester as recited in claim 5, said control means further comprising relay means responsive to said control voltage.

7. An automatic tester as recited in claim 1, said test circuit comprising a continuity detector and a supply of current for said continuity detector.

8. An automatic tester as recited in claim 1, said circuit assembly comprising a multi-conductor cable.

9. An automatic tester for testing a circuit assembly having a plurality of corresponding terminals at each end, said circuit assembly including one or more multiple circuits wherein one of the terminals at one end is connected to a corresponding terminal at the other end and to one or more succeeding terminals at said other end, the terminals at said one end corresponding to said succeeding terminals being blank and unconnected to said circuit; said tester comprising switch means for successively connecting terminals at said one end to a test circuit and for effectively grounding all other terminals at said one end, said test circuit comprising a high voltage supply and leakage detector and means for connecting said high voltage supply and leakage detector through said switch means to said successively connected terminals, and control means responsive to connection of one of said blank terminals to said test circuit for disconnecting said high voltage supply and leakage detector from said switch means.

10. An automatic tester as recited in claim 9, said control means comprising means connecting a control voltage to said blank terminals, and relay means responsive to said control voltage for disconnecting said high voltage supply and leakage detector from said switch means.

11. An automatic testor as recited in claim 9, said switch means comprising a first switch wafer having a contact finger adapted to be successively connected to said terminals at said one end and a second switch wafer adapted effectively to ground all other terminals at said one end, said second switch wafer having a notch at a position corresponding to the position of said contact finger of said first switch wafer, said high voltage supply and leakage detector being connected to said contact finger.

12. An automatic tester as recited in claim 11, said control means comprising means connecting a control voltage to said blank terminals, and relay means responsive to said control voltage for breaking the connection between said contact finger and said high voltage supply and leakage detector.

13. An automatic tester as recited in claim 9, said circuit assembly comprising a multi-conductor cable.

14. An automatic cable tester for testing a multi-conductor cable having a plurality of corresponding terminals at each end and including at least one multiple circuit wherein a terminal at one end of said cable is connected to the corresponding terminal at the other end of said cable and to one or more succeeding terminals at said other end, the terminals at said one end corresponding to said succeeding terminals being blank, said tester comprising a continuity detector and a high voltage leakage detector; a stepping switch comprising a first switch wafer for successive connection to said terminals at said other end, a second switch wafer for successive connection to corresponding terminals at said one end, a third switch wafer for successive connection to the terminals at said other end preceding the terminals conected to said first wafer and a fourth switch wafer for effectively grounding all terminals other than said corresponding terminal at said one end; means connecting a control voltage to said blank terminals; a function switch having a first position for connecting said continuity detector between said first switch wafer and said second switch wafer; control means responsive to connection of said second switch wafer to one of said blank terminals for disconnecting said second switch wafer from said continuity detector and connecting said third switch wafer thereto at the same side thereof; said function switch having a second position for connecting said high voltage leakage detector to said second switch wafer, said control means being responsive to connection of said second switch wafer to one of said blank terminals for disconnecting said second switch wafer from said high voltage leakage detector.

15. An automatic cable tester as recited in claim 14, said control means comprising a relay circuit responsive to said control voltage.

16. An automatic cable tester as recited in claim 15, said relay circuit comprising a hold circuit and a second relay circuit for breaking said hold circuit, said second relay circuit being pulsed each time said stepping switch is stepped.

17. An automatic cable tester as recited in claim 14, wherein resistors are connected between said terminals at said one end and said fourth switch wafer.

18. An automatic circuit tester, comprising a stepping switch for connecting a continuity detector successively to corresponding terminals at opposite ends of the circuit being tested and control means responsive to connection of the stepping switch to a blank terminal at one end of said circuit, corresponding to a multiple circuit leg at the opposite end, for connecting said continuity detector between said corresponding multiple circuit leg and the lagging adjacent circuit leg at said opposite end.

19. An automatic circuit tester for testing a multi-conductor assembly having a plurality of corresponding terminals at each end, said assembly including one or more multiple circuits wherein one of the terminals at one end is connected to a corresponding terminal at the other end and to one or more succeeding terminals at said other end, the terminals at said one end corresponding to said succeeding terminals being blank and unconnected to said assembly; said tester comprising means connecting a high voltage breakdown detector successively to the conductors of said multi-conductor assembly and for effectively grounding the remaining conductors of said assembly, and means responsive to the connection of said detector to one of said blank terminals for disconnecting said detector therefrom and preventing said detector from falsely indicating a short circuit to ground through one of said multiple circuits.

20. An automatic circuit tester, comprising switch means for connecting a detector successively to corresponding terminals at opposite ends of the circuit being tested and control means responsive to connection of said switch means to a blank terminal at one end of said circuit, corresponding to a multiple circuit leg at the opposite end, for connecting said detector between said multiple circuit leg and an additional multiple circuit leg at said opposite end.

21. An automatic tester including a test circuit comprising: a detector for detecting a fault in a circuit assembly having a plurality of corresponding terminals at each end, said circuit assembly including circuits connected to one or more terminals at each end, one or more of said terminals at one end being blank and unconnected to any of said circuits, said test circuit further comprising switch means for connecting said detector successively with said terminals at said one end for testing said circuits for said fault and control means responsive to connection of said switch means with a blank terminal for altering the circuit of said tester to prevent said detector from providing a false indication of said fault.

22. An automatic tester as recited in claim 21, wherein said control means comprises means connecting a signal voltage to said blank terminals.

References Cited
UNITED STATES PATENTS

| | | | |
|---|---|---|---|
| 1,977,703 | 10/1934 | Swartwout | 324—73 |
| 1,977,707 | 10/1934 | Weitzer | 324—73 XR |
| 2,699,528 | 1/1955 | Periale | 324—51 XR |
| 2,849,677 | 8/1958 | Hannon | 324—73 |
| 2,849,678 | 8/1958 | Hannon | 324—73 |
| 2,852,737 | 9/1958 | Wheeler | 324—54 XR |
| 2,985,819 | 5/1961 | Russell | 324—73 XR |
| 3,009,102 | 11/1961 | Humphreys | 324—73 XR |
| 3,217,244 | 11/1965 | Glover | 324—54 XR |
| 3,197,695 | 7/1965 | Wingfield | 324—51 |

RUDOLPH V. ROLINEC, *Primary Examiner.*

G. R. STRECKER, *Assistant Examiner.*

U.S. Cl. X.R.

324—54